| United States Patent [19] | [11] 4,015,696 |
|---|---|
| Lichti | [45] Apr. 5, 1977 |

[54] CENTRIFUGAL BRAKING DEVICE

[76] Inventor: Robert D. Lichti, 3318 Warwood, Lakewood, Calif. 90712

[22] Filed: Oct. 20, 1975

[21] Appl. No.: 624,007

[52] U.S. Cl. .............................. 188/189; 188/184
[51] Int. Cl.$^2$ .......................................... B60T 7/12
[58] Field of Search .............. 188/82.77, 184, 185, 188/189; 187/78, 38

[56] References Cited

UNITED STATES PATENTS

| 1,028,596 | 6/1912 | O'Neill | 188/189 |
| 1,425,291 | 8/1922 | Seib | 188/189 |
| 3,415,343 | 12/1968 | Svensson | 188/184 X |
| 3,715,016 | 2/1973 | Frieder | 188/184 |

*Primary Examiner*—Duane A. Reger
*Attorney, Agent, or Firm*—Charles T. Silberberg

[57] ABSTRACT

A centrifugal braking device of compact design uses at least one centrifugal body pivotally connected to a sprocket to shift from a rest position to a stop position to brake movement of a rotary shaft under certain conditions. Thus, depending upon the rotary speed and/or acceleration of the rotary shaft, the centrifugal body will pivotally shift from a rest position to a stop position to prevent rotation of the shaft. A substantially stationary annular member disposed concentrically around the hub of the sprocket has an inner bore which defines a stop for the centrifugal body when said body is shifted outwardly. Said outer bore also defines a cam surface to aid displacement of the centrifugal body from the stop position to the rest position when the shaft is rotated in a specified direction.

7 Claims, 7 Drawing Figures

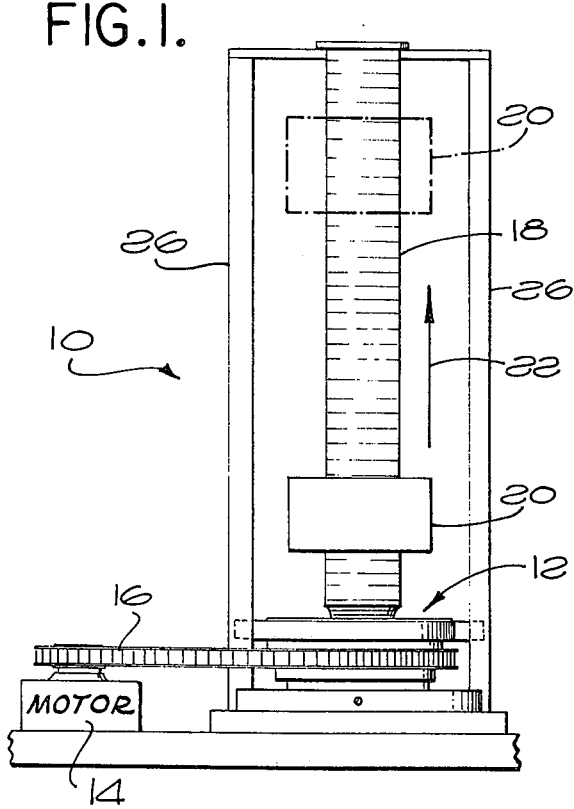
FIG.1.
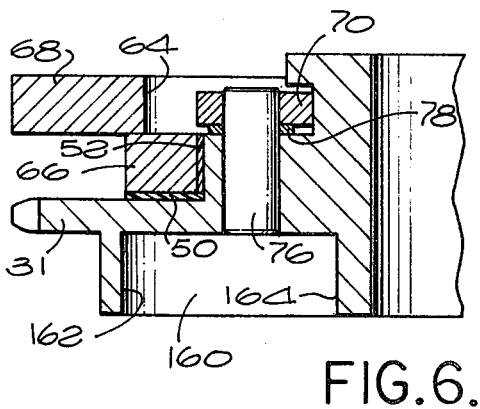
FIG.7.
FIG.6.
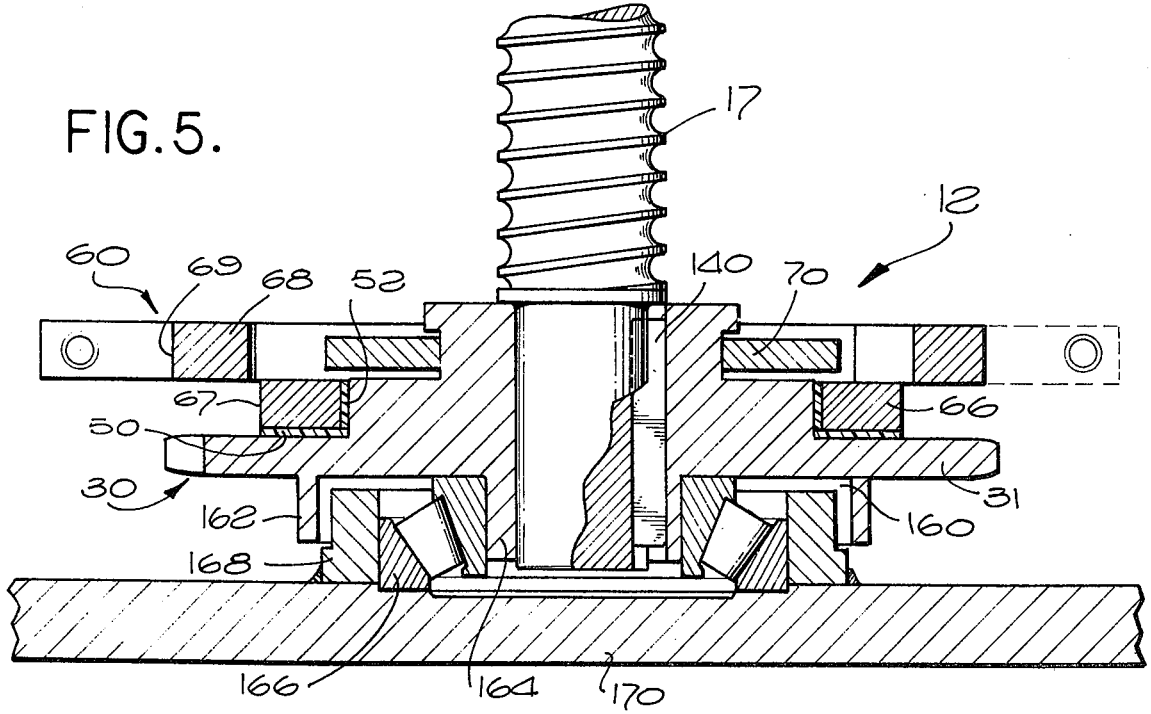
FIG.5.

1

CENTRIFUGAL BRAKING DEVICE

BACKGROUND OF THE INVENTION

This invention relates generally to a speed governor and in particular, to a braking device for a rotary shaft.

While the present invention is suitable for general application as described above, it is particularly well-suited for use with passenger loading bridges for aircraft. These bridges utilize an electrical motor and gear box chain drive to a ball screw to provide vertical movement to the bridge. The present systems do not have a safety provision to stop the bridge from going completely down to the bottom limit of the vertical drive column in case of failure of the brake of the electrical motor, chain, or gear box. The abrupt dropping of the bridge can cause injury to passengers as well as damage to the aircraft.

Other centrifugal force speed governors have previously been disclosed. These are exemplified by U.S. Pat. Nos. 3,715,016 to Frieder, 2,388,046 to Beall, and 3,415,343 to Svensson.

However, the prior art braking devices have been quite large, complicated, slow to respond, and require disassembly of the system for resetting once the problem has been corrected.

SUMMARY OF THE INVENTION

It is, therefore, an object of the present invention to provide a relatively simple, inexpensive centrifugal braking device for a rotary shaft.

It is another object of the present invention to provide a highly compact centrifugal braking device for a rotary shaft.

It is yet another object of the present invention to provide a centrifugal braking devise having a cam surface to aid the displacement of a centrifugal stop member from the stop or braking position to a rest position where the shaft can be rotated in the desired direction.

It is still another object of the present invention to provide a centrifugal braking device having a short response time for braking action.

It is still another object of the present invention to provide a centrifugal braking device responsible to both angular velocity and angular acceleration of a rotary shaft.

Briefly, in accordance with the invention, there is provided a centrifugal braking device for a rotary shaft comprising a sprocket, at least one centrifugal body, and a substantially stationary annular member. The centrifugal body is pivotally connected to the hub of the sprocket and is shiftable from a rest position to an outward stop position in response to centrifugal force. The annular member is substantially stationary and is disposed concentrically around the hub of the sprocket and has a bore aligned with the centrifugal body, said bore defining a stop thereon such that with sufficient centrifugal force the centrifugal body will move outwardly and engage the stop of the substantially annular member to brake the rotary shaft.

In the preferred embodiment, the braking device is also responsive to angular acceleration of the rotary shaft and the periphery of the bore of the annular member defines a cam surface that aids displacement of the cetrifugal body from the stop position to the rest position when the rotary shaft is rotated in a specified direction.

Other objects and advantages of the invention will become apparent on reading the following detailed description and upon reference to the drawings.

BRIEF DESCRIPTION OF THE DRAWINGS

FIG. 1 is a schematic elevational view of the centrifugal braking device as used in a screw lifting assembly;

FIG. 5 is a sectional elevational view of the centrifugal braking device of FIG. 3 taken in the direction of arrows 5—5 of FIG. 3;

FIG. 6 is a detail sectional view of the connection of a centrifugal body to the sprocket taken in the direction of arrows 6—6 of FIG. 3;

FIG. 7 is a detail sectional view of the attachment of a restraining spring to a keeper-block attached to the sprocket hub taken in the direction of arrows 7—7 of FIG. 3.

Figure 2:
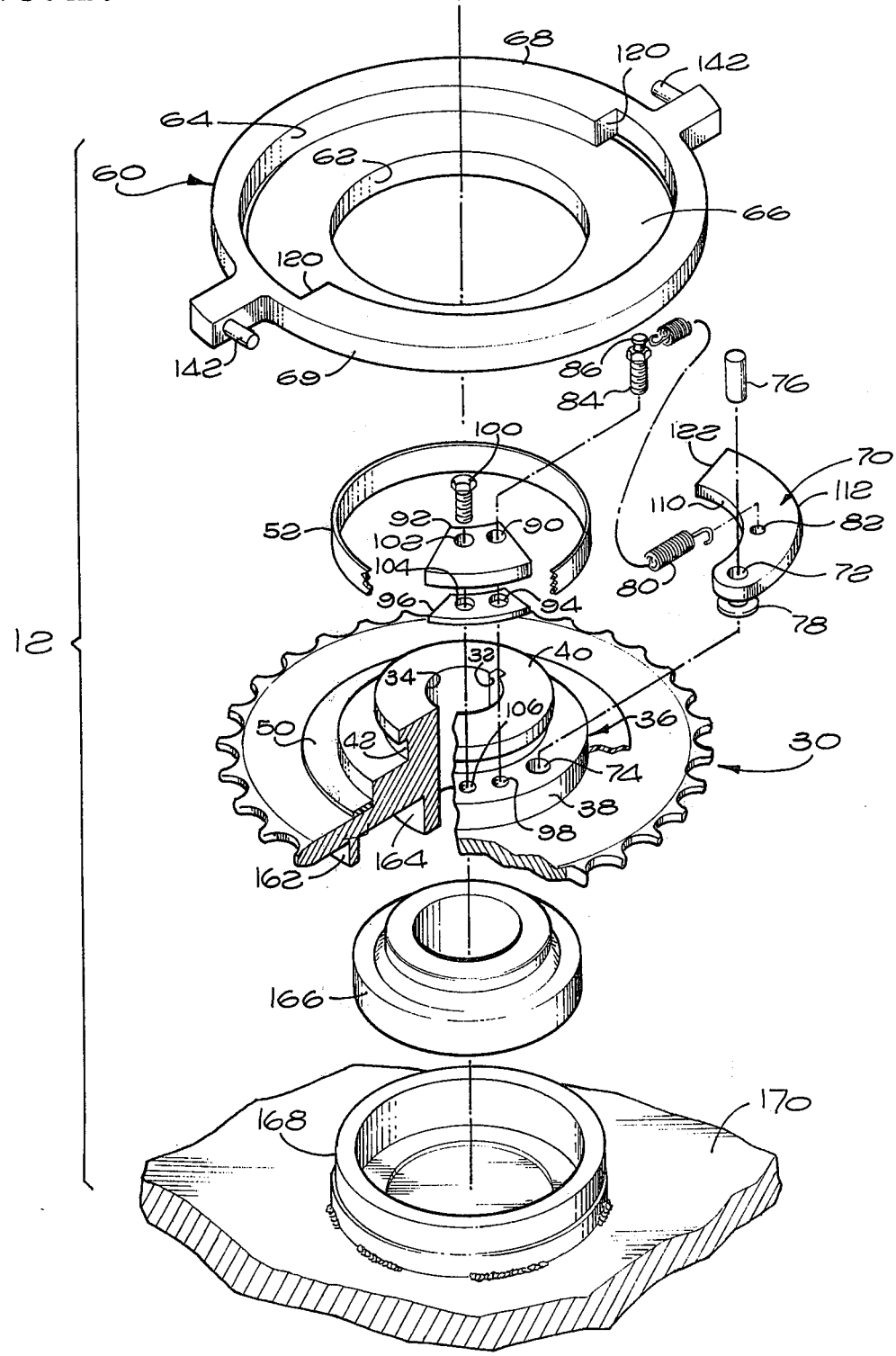
FIG. 2 is an exploded perspective view of the present centrifugal braking device with certain symmetrical members omitted.

While the invention will be described in connection with the preferred embodiment, it will be understood that it is not intended to limit the invention to those embodiments. On the contrary, it is intended to cover all alternatives, modifications, and equivalents that may be included within the spirit and scope of the invention as defined by the appended claims.

DETAILED DESCRIPTION OF THE INVENTION

Turning first to FIG. 1, the centrifugal brake mechanism is shown functionally attached to a screw elevating assembly generally indicated at 10. The brake mechanism generally indicated at 12 is drivingly connected to a motor 14 through a chain 16. A ball screw 17 (Fig. 5) which can be located within a telescopic cover 18 raises and lowers by its rotation a support block 20. Thus, a support block 20 is shown in its lower position in solid lines and in elevated position shown in broken lines when raised in the direction of arrow 22. Stationary rails 26 and 27 (FIG. 3) act as side frames for the screw device 10 and also as stationary members for the brake device 12 to bear against to prevent rotation of the ball screw 17. Thus, when the angular speed (and acceleration if device 12 is so provided) of the ball screw rotation in the direction for moving support block 20 downward exceeds a predetermined level such that support block 20 would move downward at a dangerous speed, such as by the breaking of chain 16, the centrifugal brake device through a mechanism to be described hereinafter stops rotation of the ball screw 17 and thereby the descent of support block 20.

Referring now to FIG. 2, sprocket 30 is provided in engaging relationship with chain 16 (FIG. 1) to drive the ball screw 17 (FIG. 5). Sprocket 30 is drivingly connected to ball screw 17 by means of a key 140 on ball screw 17 and slot 32 within a central bore 34 in sprocket 30. Sprocket 30 has a hub generally indicated at 36 preferably integrally attached thereto. Hub 36 is made up of a lower ring 38 and upper ring 40 connected by axial wall 42. Lower ring 38 extends radially outward a greater distance relative to upper ring 40. A washer 50 is positioned concentric with and adjacent to lower ring 38 of hub 36. Washer 50 is preferably of a material, such as nylatron, that will present a relatively friction-free surface. A circular strip 52, also preferably of nylatron, is positioned over and perpendicular to washer 50 and also concentric with and adjacent to the outer periphery of ring 38.

An annular cam housing 60 is positioned over sprocket 30 concentric with hub 36 of sprocket 30 with the lower surface of cam housing 60 resting on washer 50 and the inner periphery of bore 62 of housing 60 contacting strip 52. Cam housing 60 is substantially stationary as opposed to sprocket 30 which rotates relative to cam housing 60, such rotation being relatively friction-free by virtue of nylatron washer 50 and strip 52. Cam housing 60 has an outer bore 64 also defined therein, said outer bore 64 having a relatively larger diameter than inner bore 62. In essence, cam housing 60 comprises a pair of rings 66 and 68 preferably integrally connected. Optimally, the combined thickness of ring 66 and washer 50 is equivalent to the thickness of ring 38 so that the upper surface of ring 66 is in alignment with the upper surface of ring 38.

Figure 3:
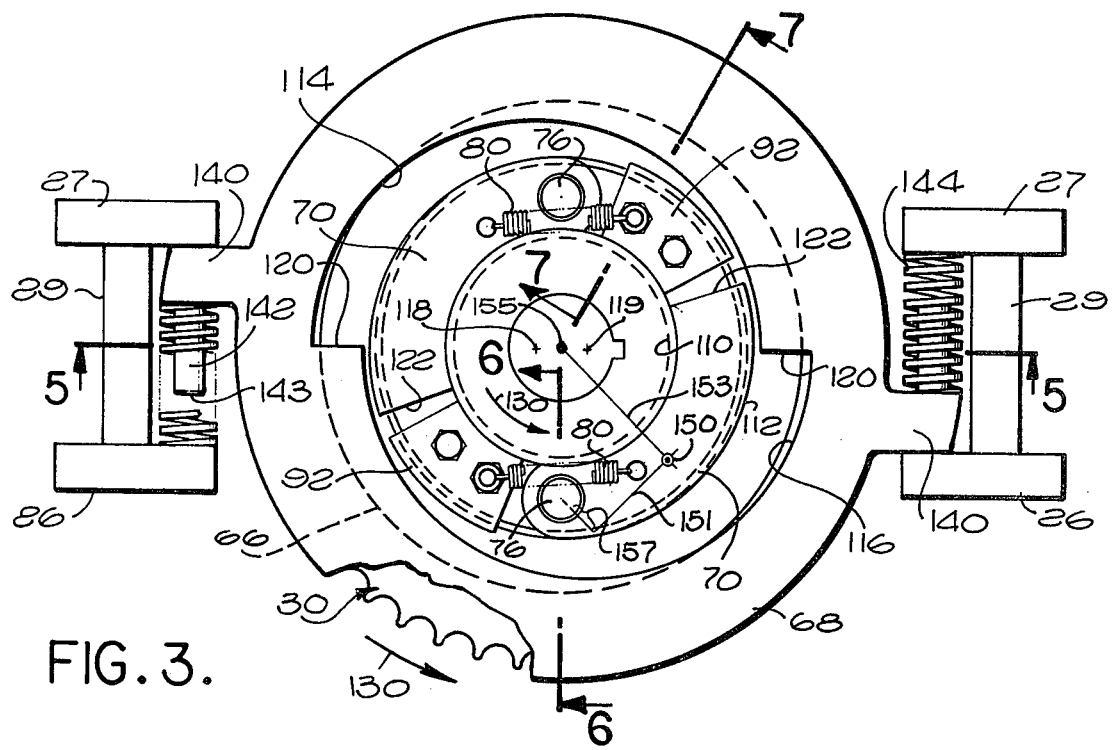
FIG. 3 is a plan view with portions broken away of the braking device illustrating the rest position for the centrifugal bodies.

At least one centrifugal body 70 (another could be symmetrically provided as shown in FIG. 3) is pivotally connected to the upper surface of ring 38 of hub 36. For this purpose, member 70 and ring 38 have aligned apertures 72 and 74 respectively, drilled therein in which a pin 76 is positioned. A washer 78 is preferably provided between apertures 72 and 74 to slightly elevate member 70 above the upper surface of ring 38 and ring 66 in order to lessen friction and allow for the free rotational movement of member 70. Centrifugal member 70 is resiliently biased inwardly by a spring 80 that is attached to an aperture 82 in member 70 and a nail head extension 86 of a bolt 84. The positioning of spring 80 is such that it provides decreasing resistance as member 70 pivots outwardly due to the decreasing size of the lever arm between pin 76 and bolt 84, thereby causing a snap-out effect. The spring 80 is located above member 70 and additionally functions to elevate member 70 above ring 38 and ring 66. Bolt 84 is positioned within aperture 90 of keeper-block 92, aligned aperture 94 of washer 96, and aligned aperture 98 in ring 38 of hub 36. Keeper-block 92 is additionally fastened to ring 38 by means of a cap screw 100 which fits in aperture 102 of keeper-block 92, aligned aperture 104 of washer 96, and aperture 106 of ring 38.

Figure 4:
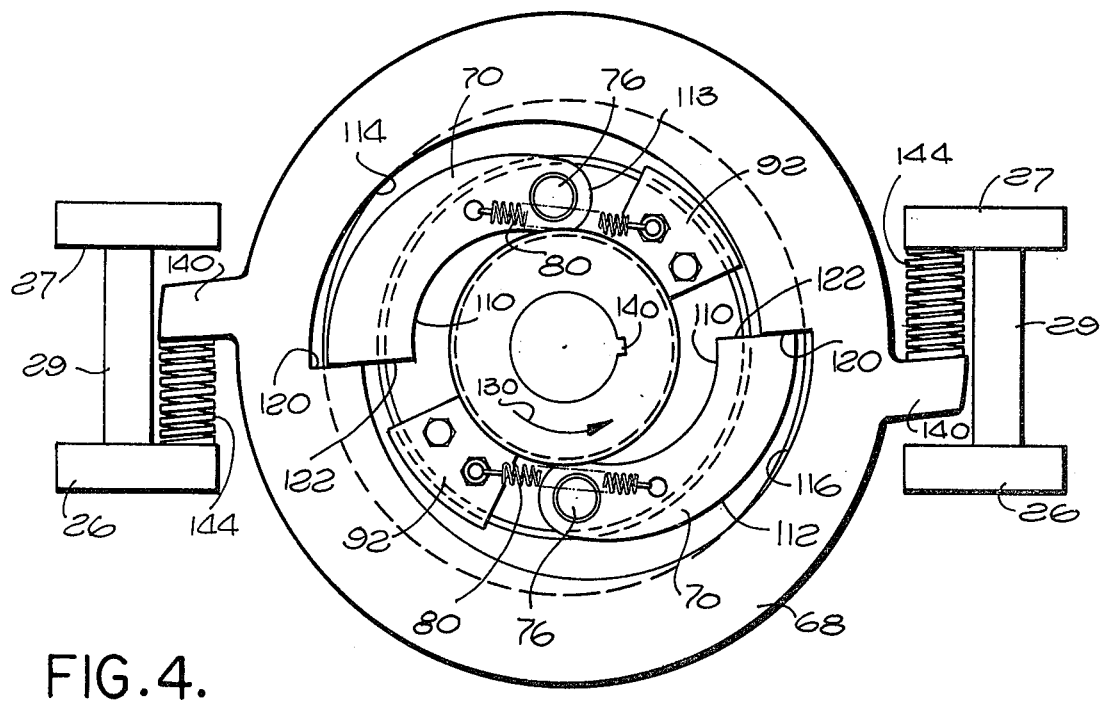
FIG. 4 is a plan view of the braking device illustrating the stop position of the centrifugal bodies and the damping action of springs attached to the substantially stationary annular member.

Referring now to FIGS. 2, 3, and 4, it is seen that the centrifugal member 70 has arcurately shaped sides 110 and 112. The inner side 110 preferably has a radius of curvature substantially the same as that of the outer periphery of axial wall 42 of hub 36. Thus, in the rest position as illustrated in FIG. 3, centrifugal bodies 70 (in this case two centrifugal bodies 70 are used, as are two keeper blocks 92 and the attachments thereto) are positioned with their side 110 adjacent axial wall 42 of hub 36. In this position, bodies 70 simply rotate with sprocket 30 without interfering with such rotation by contact with outer bore 64 of cam housing 60.

Outer bore 64 of cam housing 60 is defined by two semi-circles 114 and 116 having the same radius, but offset centers of curvature 118 and 119 respectively. By virtue of this offset, two rib-like areas or stops 120 are defined at the junctures of semi-circles 114 and 116. When the angular velocity of sprocket 30 increases above a predetermined level, the centrifugal force upon members 70 will be sufficient to overcome the restraining bias of springs 80 forcing outward rotary movement (by virtue of pivotal connections at 76) of members 70. When the direction of rotation is counter-clockwise as shown by arrows 130 which corresponds to a downward movement of support block 20 (FIG. 1), members 70, when sufficiently outwardly rotated, will contact stop members 120 at their contact surfaces 122, which are preferably flat.

By virtue of this contact with stops 120 of cam housing 60 which is stationary or substantially stationary, rotation of members 70 in the direction of arrows 130 is prevented, accordingly preventing such rotation of sprocket 30 by virtue of the pinned connection to members 70 and also thereby rotation of ball screw 17 by virtue of its keyed connection to sprocket 30 at 140. Thus, downward movement of support block 20 is halted when the centrifugal members 70 are in the stop position (FIG. 4).

Cam housing 60 can be made stationary in any suitable manner or, preferably, made substantially stationary. As an example of this latter design approach, cam housing 60 has integral flanges 140 positioned on the outer periphery 69 of ring 68. Each flange 140 has a pin 142 connected perpendicular thereto. Stationary supports made up of end rails 26 and 27 and center rails 29 which join parallel rails 26 and 27 are positioned adjacent flanges 140. A spring 144 is positioned around each pin 142 and bears against one edge of flange 140 and an inner edge of end rails 26. In the rest position of members 70, the free end 143 of pins 142 is spaced from respective rails 26, and the spring 144 biases the opposite end of flanges 140 against the inner edge of the rail members 27 (See FIG. 3). When, however, centrifugal bodies 70 contact stops 120 of cam housing 60, the cam housing is rotated due to the force of contact in a counter-clockwise direction overcoming the force of springs 144 until ends 143 of pins 142 contact rail members 26. In this manner the rotation of ball screw 17 and the downward movement of support block 20 is slowed resiliently by springs 144 prior to being stopped when pins 142 contact rail members 26, thereby cushioning the shock of an abrupt stop.

Centrifugal bodies 70 can also be designed to be responsive to angular acceleration of ball screw 17 (and sprocket 30), i.e., bodies 70 pivot outwardly in response to angular acceleration above a predetermined valve. This is accomplished in the present invention by having the centrifugal bodies 70 designed such that the center of gravity 150 of each body 70 is located so that the force responsive to the angular acceleration on bodies 70 which is directed along a line 151 perpendicular to the line 153 between the axis of rotation 155 and center of gravity 150 acts outwardly of the center of pin 76 a distance 157 (directed parallel to line 153). The magnitude of distance 157 should not be too great or else the members 70 would become overly responsive to acceleration causing unnecessary actuation of the braking mechanism. Conversely, if distance 157 is too small, the acceleration responsiveness is minimized. Should the center of gravity 150 be such that line 151 falls inward of pivot 76, increasing angular acceleration will act to restrain members 70 from outward movement.

When ball screw 17 and sprocket 30 are rotating in the clockwise direction corresponding to an upward movement of support block 20, the brake mechanism 12 of the present system will be substantially inoperable. During such upward movement, the brake need not operate as dangerous failures in the system would only cause or result in a counter-clockwise movement 130, thereby activating the brake. In any case, should the clockwise rotation of sprocket 30 and ball screw 17 exceed a predetermined value, centrifugal bodies 70 will rotate outwardly contacting outer bore 64 of cam housing 60 due to the centrifugal force on members 70 overcoming the spring force of springs 80 thereby resulting in some braking due to the frictional contact between sides 112 of members 70 and outer bore 64 of cam housing 60. There will, of course, not be a complete stop caused by brake mechanism 12 because stops 120 and contact surfaces 122 are directed for counter-clockwise rotation and will not register in clockwise rotation.

It should be noted that when the brake mechanism 12 is in the stop position shown in FIG. 4 with centrifugal members 70 engaging stops 120, clockwise rotation of ball screw 17 and sprocket 30 corresponding to upward movement of support block 20 (which indicates that the failure of the system has been corrected) will separate contact surface 122 of members 70 from stops 120 thereby allowing springs 80 to exert an effective return force upon members 70 to the rest position of FIG. 3. In addition to such spring force, outer bore 64 of cam housing 60 is designed to cam members 70 inwardly when sprocket 30 is rotating clockwise by virtue of the offset of semi-circles 114 and 116.

Referring now to FIG. 5, the fitted relationship of the parts illustrated in FIG. 2 is shown along with the compact nature of brake mechanism 12. In essence, brake mechanism 12 is seen to be a sprocket 30 with attachments thereto. As is also more clearly illustrated in this figure, inner ring 66 of cam housing 60 has an outer periphery 67 radially inward of the outer periphery 69 of outer ring 68. Also shown is the cavity 160 (See also FIG. 6 and FIG. 7) defined by an outer axially extending cylindrical wall 162 connected to sprocket wheel 31 and concentric with an axially extending cylindrical wall 164 which is an extension of hub 36. In this cavity 160 is positioned bearing 166 and bearing housing 168. Bearing housing 168 is fixedly attached to support plate 170.

FIGS. 6 and 7 illustrate in detail the connection of centrifugal bodies 70 (FIG. 6) and the spring connection to keeper-block 92 (FIG. 7).

Thus, it is apparent that there has been provided, in accordance with the invention, a centrifugal braking device that fully satisfies the objects, aims, and advantages set forth above. While the invention has been described in conjunction with specific embodiments thereof, it is evident that many alternatives, modifications, and variations will be apparent to those skilled in the art. Accordingly, it is intended to embrace all such alternatives, modifications, and variations as fall within the spirit and scope of the appended claims.

What is claimed is:

1. A centrifugal braking device for a rotary shaft comprising:
   a sprocket mounted to said shaft for rotation therewith, said sprocket having a cylindrical hub,
   at least one centrifugal body pivotally connected to said hub, said body having a contact surface thereon, said body being shiftable about an axis extending generally parallel to the rotation axis of said shaft from a rest position on non-use where said contact surface is immediately adjacent to the peripheral surface of said hub to a stop position outwardly displaced from the periphery of said hub in response to centrifugal force, and
   a substantially stationary annular member having an inner bore and an outer bore, said annular member being disposed concentrically around said hub with said inner bore positioned adjacent to said hub and said outer bore being radially displaced from said hub, the periphery of said outer bore being aligned with said body and having at least one contact surface defined thereon facing in countering relation to one direction of rotation of said shaft in position to be struck by said contact surface on said body for stopping engagement therewith when said body is pivoted outwardly to said stop position in response to centrifugal force, the periphery of said outer bore also defining a cam surface that aids displacement of said body from the stop position to the rest position when said shaft is rotated in the other direction.

2. A centrifugal braking device for a rotary shaft comprising:
   a sprocket mounted to said shaft for rotation therewith, said sprocket having a cylindrical hub,
   at least one centrifugal body pivotally connected to said hub, said body having a contact surface thereon, said body being shiftable about an axis extending generally parallel to the rotation axis of said shaft from a rest position on non-use where said contact surface is immediately adjacent to the peripheral surface of said hub to a stop position outwardly displaced from the periphery of said hub in response to centrifugal force, and
   a substantially stationary annular member having an inner bore and an outer bore, said annular member being disposed concentrically around said hub with said inner bore positioned adjacent to said hub and said outer bore being radially displaced from said hub, the periphery of said outer bore being aligned with said body and having at least one contact surface defined thereon facing in countering relation to one direction of rotation of said shaft in position to be struck by said contact surface on said body for stopping engagement therewith when said body is pivoted outwardly to said stop position in response to centrifugal force, at least a portion of said inner bore being axially spaced from said outer bore such that the periphery of said inner bore is out of alignment with said body.

3. The braking device of claim 1 wherein said body is also responsive to angular acceleration of said shaft.

4. The braking device of claim 3 also including a stationary member, and a damping spring mounted to said stationary member and said annular member, said damping spring providing a damping force when said contact surface of said body strikes said contact surface of said outer bore.

5. The braking device of claim 4 also including at least one restraining spring connected to said hub and said body, for biasing said body to said rest position.

6. The braking device of claim 1 wherein at least a portion of said inner bore is axially spaced from said outer bore such that the periphery of said inner bore is out of alignment with said body.

7. The braking device of claim 1 wherein said inner bore is axially spaced from said outer bore.

* * * * *